(12) United States Patent
Waite (10) Patent No.: US 9,908,112 B2
(45) Date of Patent: Mar. 6, 2018

(54) REGENERATION OF AN ION EXCHANGE COLUMN (71) Applicant: IONEX SG LIMITED, Gloucestershire (GB)

(72) Inventor: Michael Waite, Gloucestershire (GB)

(73) Assignee: IONEX SG LIMITED (GB)

( * ) Notice: Subject to any disclaimer, the term of this patent is extended or adjusted under 35 U.S.C. 154(b) by 38 days.

(21) Appl. No.: 14/764,756

(22) PCT Filed: Feb. 3, 2014

(86) PCT No.: PCT/GB2014/050292
§ 371 (c)(1),
(2) Date: Jul. 30, 2015

(87) PCT Pub. No.: WO2014/118572
PCT Pub. Date: Aug. 7, 2014

(65) Prior Publication Data
US 2015/0375222 A1 Dec. 31, 2015

(30) Foreign Application Priority Data
Feb. 1, 2013 (GB) .................................. 1301859.3

(51) Int. Cl.
*B01J 49/00* (2017.01)
*B01J 41/05* (2017.01)
(Continued)

(52) U.S. Cl.
CPC .......... *B01J 49/0073* (2013.01); *B01J 41/05* (2017.01); *B01J 49/07* (2017.01); *B01J 49/57* (2017.01);
(Continued)

(58) Field of Classification Search
USPC ................................................. 210/677, 670
See application file for complete search history.

(56) References Cited

U.S. PATENT DOCUMENTS 3,664,950 A * 5/1972 Saraceno ............. C01G 37/003
210/662
4,259,297 A * 3/1981 Kaczur ................. C01B 11/145
205/503

(Continued)

FOREIGN PATENT DOCUMENTS

| GB | 626882 | * | 7/1949 |
| GB | 626882 A | | 7/1949 |
| GB | 2002735 A | | 2/1979 |
| WO | 2006097762 A2 | | 9/2006 |

OTHER PUBLICATIONS

Intellectual Property Office, Application GB1301859.3, dated Jun. 7, 3013 Patent Act 1977: Search Report under Section 17 1 page.
(Continued)

*Primary Examiner* — Mark Kaucher
*Assistant Examiner* — Henry Hu
(74) *Attorney, Agent, or Firm* — Luedeka Neely Group, PC (57) ABSTRACT

The present invention relates to a method of regenerating an ion exchange material loaded with chromate ions and nitrate ions in an ion exchange column, the method comprising subjecting the loaded ion exchange column to a regeneration sequence comprising the following steps: (i) passing a first salt solution through the column forming a first effluent solution; (ii) passing a second salt solution through the column to at least partially remove the chromate ions from the column forming a second effluent solution, wherein the second salt solution has a higher salt concentration than the first salt solution; (iii) passing a third salt solution through the column to at least partially remove nitrate ions from the column forming a third effluent solution, wherein the third salt solution has a salt concentration higher than the second salt solution.

19 Claims, 3 Drawing Sheets

(51) Int. Cl.
- *B01J 49/07* (2017.01)
- *B01J 49/57* (2017.01)
- *B01J 49/60* (2017.01)
- *C02F 1/42* (2006.01)
- *C02F 101/16* (2006.01)
- *C02F 101/22* (2006.01)
- *C02F 1/461* (2006.01)

(52) U.S. Cl.
CPC ................ *B01J 49/60* (2017.01); *C02F 1/42* (2013.01); *C02F 1/461* (2013.01); *C02F 2001/422* (2013.01); *C02F 2101/163* (2013.01); *C02F 2101/22* (2013.01); *C02F 2303/16* (2013.01)

(56) References Cited

U.S. PATENT DOCUMENTS

2007/0114178 A1* 5/2007 Coppola ................ B01J 41/046 210/660
2009/0071906 A1* 3/2009 Mawle ..................... C02F 1/42 210/677

OTHER PUBLICATIONS

PCT International Search Report, International Application PCT/GB20140502925, PCT Article 18 and Rules 43 and 44 dated Apr. 14, 2014 Authorized Officer Nicoleta Kaluza 4 pages.

\* cited by examiner

REGENERATION OF AN ION EXCHANGE COLUMN

CROSS-REFERENCE TO RELATED APPLICATION

This application claims priority under all applicable statutes, and is a U.S. National phase (37 U.S.C. Section 371) of International Application PCT/GB2014/050292, filed 3 Feb. 2014, and entitled REGENERATION OF AN ION EXCHANGE COLUMN, which claims priority to GB 1301859.3, filed 1 Feb. 2013, incorporated herein by reference in its entirety.

The present invention relates to a method of regenerating an ion exchange material loaded with chromate ions and nitrate ions in an ion exchange column, and to the use of a salt solution to remove chromate ions from an ion exchange material loaded with chromate ions and nitrate ions.

Ion exchange materials such as strong base anion (SBA) exchange resins and nitrate-selective anion exchange resins are used in systems for the treatment of water, especially but not exclusively, systems for the treatment of drinking water.

SBA exchange resins and nitrate-selective anion exchange resins have been used to reduce nitrate levels in water in regions where nitrate levels in water exceed the relevant drinking water standards. Typically, treatment plants operate on a proportion of the total water flow in order to produce a product water which is below the relevant drinking water standard.

In typical drinking water treatment, the major competing anions are sulphate, nitrate, bicarbonate and chloride. The order of selectivity of SBA exchange resins is Cl, $HCO_3$, $SO_4$ and $NO_3$. Such a sequence can result in the unwanted phenomenon known as nitrate sledging when SBA exchange resins are used. Nitrate sledging is where sulphate ions in the water entering the ion exchange column displaces nitrate ions already absorbed on the resin, leading to a higher nitrate level in the column outlet than in the water entering the column. Due to the problem of nitrate sledging occurring where SBA exchange resins are used, nitrate-selective resins have been developed. The selectivity of sulphate and nitrate is reversed when using nitrate-selective resins, ensuring that sledging does not occur. As a result, nitrate selective resins have now largely replaced SBA exchange resins for the treatment of drinking water.

Conventionally, when nitrate-selective and strong base anion exchange resins are used a number of ion exchange columns containing the resins are operated in a 'merry go round' system, with each column being successively regenerated when it reaches its capacity for nitrate. Operation of plants in this manner ensures the most cost efficient method of removing nitrate from water for potable use.

Hexavalent chromium is also a common contaminant in water in a number of regions and concerns over the health effects of this have led to increasing requirements to reduce levels in potable water. It is postulated that the chromium is likely to be present in groundwater as a result of a chelating reaction with fulvic and or humic acids, naturally present in groundwater. Traditional treatment methods for hexavalent chromium have used weak base anion resins for its removal. However, this method also removes a large amount of other anions from the water and have very high operational costs and produce significant waste volumes with high disposal costs as it is necessary to treat the entire water flow to reduce chromium levels to acceptable standards. Large volumes of waste effluent require appropriate disposal. The elimination or reduction in volume of chromate ion contaminated waste streams potentially offers advantages in terms of reduction in the cost and/or complexity of equipment required to handle the waste streams and to treat them to achieve environmentally appropriate concentrations for discharge.

International patent application PCT/GB2006/001002 describes a regeneration process for water treatment substrates. In particular, in one embodiment International patent application PCT/GB2006/001002 describes a selective anion ion exchange material, especially a nitrate-selective ion exchange material, which is subjected to liquid washing, preferably comprising sequential wash steps using different liquids, for example, a first elution step with a dilute brine solution and a second elution step with a concentrated brine solution. Anionic species including the anionic species to be eliminated (e.g. sulphate) are removed in sequential wash steps, and there are formed a plurality of fractions comprising said anionic species to be eliminated, the second waste stream comprising one or more said fractions. This application describes that preferably, if a third brine solution is passed through the column, the third brine solution has a concentration similar to the second brine solution. International patent application PCT/GB2006/001002 is silent on the problems of chromate ion removal in water treatment and is silent on the removal of chromate ions from any ion exchange materials.

The ion exchange regeneration process works by introducing a strong salt solution into a loaded ion exchange column. The salt solution essentially reverses the ion exchange sequence, replacing absorbed nitrate, sulphate and bicarbonate ions with chloride ions, enabling the column to be returned to service. The used regenerant from this process, together with rinse water associated with removing the residual salt from the ion exchange column become a waste which may require off site treatment and disposal.

It is one object of the present invention to overcome or address the problems of prior art regeneration of water treatment substrates or to at least provide a commercially useful alternative thereto. It is an alternative and/or additional object to provide a method of regenerating an ion exchange material loaded with chromate ions and nitrate ions in an ion exchange column, which is cheaper and/or more effective and/or more efficient than known methods. It is an alternative and/or additional object to provide a method of regenerating an ion exchange material loaded with chromate ions and nitrate ions in an ion exchange column which minimises the waste volume produced by the process and optionally enables further treatment of the chromium bearing fraction.

In the first aspect of the present invention there is provided a method of regenerating an ion exchange material loaded with chromate ions and nitrate ions in an ion exchange column, the method comprising subjecting the loaded ion exchange column to a regeneration sequence comprising the following steps:
  (i) passing a first salt solution through the column forming a first effluent solution;
  (ii) passing a second salt solution through the column to at least partially remove the chromate ions from the column forming a second effluent solution, wherein the second salt solution has a higher salt concentration than the first salt solution;
  (iii) passing a third salt solution through the column to at least partially remove nitrate ions from the column forming a third effluent solution, wherein the third salt solution has a salt concentration higher than the second salt solution.

This invention describes an efficient way to operate an ion exchange plant to remove nitrates to the required standards whilst treating the entire flow for chromium removal. It further describes a method for separating the fraction containing the removed chromium during regeneration of the resin to minimise the waste volume produced by the process and enables further treatment of the chromium bearing fraction.

The present inventors have found that it is possible to selectively regenerate the ion exchange resin to separate the sulphate ions from the nitrate ions. Whilst this could be anticipated by a person skilled in the art for nitrate selective resins, this is an unexpected observation for SBA resins where the nitrate would be expected to elute before the sulphate (from the ion exchange sequence detailed above).

In a further aspect of the present invention there is provided the use of a salt solution to remove chromate ions from an ion exchange material loaded with chromate ions and nitrate anions; wherein the salt solution has a concentration of chloride ions of from 3,000 ppm to 55,000 ppm.

In a preferred embodiment the ion exchange material is a strong base anion (SBA) exchange resin or a nitrate-selective anion exchange resin, most preferably a nitrate selective anion exchange resin.

As used herein the term "chromate ions" includes any hexavalent chromium species present in aqueous solution. These include $CrO_4^{2-}$, $HCrO_4^-$, $Cr_2O_7^{2-}$, $HCr_2O_7^-$ and hydrated forms thereof.

As outlined above, it may be desirable to remove or reduce the levels of nitrate and chromate ions from water. One method of doing this is to pass the total flow from a water source requiring both nitrate and chromium removal/or reduction to an ion exchange system, optionally comprised of a number of columns, containing a selective ion exchange resin, preferably a nitrate selective anion exchange resin. In a preferred method, unlike conventional nitrate treatment processes using this resin, each column remains in service for substantially longer than its traditionally accepted service duty (nitrate capacity). Surprisingly, it has been found that this resin will continue to remove chromium to below detectable levels despite exceeding its service capacity for nitrate removal. Therefore, a plant may be operated in such a way that, for example, in a standard three column 'merry go round' system, two columns can be operated in service with the third column in standby mode after regeneration to the point where the leading column is no longer removing nitrate but the nitrate levels from the two in-service columns are combined to achieve the desired nitrate output level. As chromium is removed by both columns, the process is effective for the efficient treatment of both high nitrate and chromium levels. Operation in this manner allows the standby column to be bought into service when the combination of the leading column and the other column in service together no longer have the available nitrate removal capacity to reduce the nitrate to the desired level. At that point, the lead column would be taken out of service and regenerated, the second in-service column would become the lead column and the standby column can be bought into service in parallel with the (new) lead column. Flow through the two in service columns may be controlled in order to produce the desired output nitrate concentration. Thus, the chemical usage and waste volumes produced would not be significantly greater than a nitrate removal plant operated in a conventional manner. It will be understood that the 'merry go round' system would also function with more than three columns.

The present inventors have developed a method of regenerating an ion exchange material loaded with chromate ions and nitrate ions in an ion exchange column. The use of a sequential regeneration treatment process allows the regenerant fraction containing the chromium to be separated. Advantageously the process allows the majority of the chromium ions to be separated as a separation fraction from the majority of the nitrate ions originally present on the column. Moreover, the process described herein allows the removal of substantially all of the chromate ions from the ion exchange material loaded in a relatively small volume of solution. This has the advantage that the amount of waste effluent required to be treated and/or disposed of containing high levels of chromate ions is reduced. It is unexpected that such a process is successful as the interaction of chromate ions with the ion exchange column is thought to be different from the typical ion exchange interaction of the column with other anions, for example nitrate ions, sulphate ions and/or bicarbonate ions. Conventional ion exchange loading anions follow an anion exchange series $Cl^- > CO_3^{2-} > NO_3^- > SO_4^{2-}$. On a nitrate-selective ion exchange material the series is $Cl^- > CO_3^{2-} > SO_4^{2-} > NO_3^-$. In order to regenerate the exchange material, the process must be reversed. As chromate ions are known to be retained after the nitrate retention of the column is exhausted, it would be expected, if a typical ion exchange process is occurring, to be very difficult to regenerate the exchange material once chromate ions are retained on the material. The present inventors have, however, surprisingly found that this is not the case and have found that chromate ions can be removed more easily and substantially before the nitrate ions. Without wishing to be bound by any particular theory, it is thought that the chromate ions may be physically absorbed onto the ion exchange material.

In a preferred embodiment the ion exchange material used herein is a nitrate-selective anion exchange material, typically a resin or a strong base anion (SBA) exchange resin. Most preferably the ion exchange material is a nitrate selective anion exchange resin.

The nitrate-selective anion exchange material exchanges nitrate ions in water preferentially over other anions such as sulphate and phosphate. The anion exchange resin may, for example, be a nitrate-selective resin which exchanges nitrate ions with chloride or bicarbonate ions. Examples of suitable nitrate selective resins are Purolite A520E supplied by Purolite International Limited and IMAC HP555, supplied by Rohm & Haas Limited.

Examples of suitable strong base anion (SBA) exchange resins are Purolite A600E/4149 supplied by Purolite International Limited, Amberlite (TM) PWA7 supplied by Rohm & Haas Limited, Resintech SGB1 and Resintech SGB2 both supplied by Resintech, Inc., and Lewatit ASB 1 supplied by Lanxess Deutschland GmbH.

In the first step of the process, a first salt solution is passed through an ion exchange column containing an ion exchange material loaded with chromate ions and nitrate ions forming a first effluent solution. Preferably, the first effluent solution comprises sulphate anions and/or bicarbonate anions which have been removed from the ion exchange material.

Preferably, the first solution is chosen such that elution of an ion exchange material loaded with chromate ions, nitrate ions and preferably sulphate anions and/or bicarbonate anions results in removal of at least some of the sulphate anions and/or bicarbonate anions from the column into the first effluent solution. Preferably, the first effluent solution is enriched with sulphate anions and/or bicarbonate anions compared with the first salt solution. Preferably at least 75% by weight of the total sulphate anions and/or bicarbonate anions originally present in the ion exchange material before the regeneration treatment is started are eluted into the first effluent solution. More preferably, at least 90%, or at least 95% by weight of the total sulphate anions and/or bicarbonate anions originally present in the ion exchange material before the regeneration treatment is started are eluted into the first effluent solution.

In the second step of the process, a second salt solution is passed through the ion exchange column. This second salt solution is passed through the ion exchange column sequentially after the first salt solution. The second salt solution has a higher salt concentration than the first salt solution. Passing the second salt solution through an ion exchange column forms a second effluent solution. The second effluent solution comprises chromate ions which have been removed from the ion exchange material.

Preferably, the second salt solution is chosen such that elution of an ion exchange material loaded with chromate ions and nitrate ions results in removal of at least some of the chromate ions from the column into the second effluent solution. Preferably, the second effluent solution is enriched with chromate ions compared with the second salt solution. Preferably at least 75% by weight of the total chromate ions originally present in the ion exchange material before the regeneration treatment are eluted into the second effluent solution. More preferably, at least 90%, or at least 95% by weight of the total chromate ions originally present in the ion exchange material before the regeneration treatment is started are eluted into the second effluent solution. Although some of the nitrate ions may be removed in the second effluent solution along with the chromate ions, preferably less than 20%, less than 10% or less than 5% by weight of the total nitrate ions originally present in the ion exchange material before the regeneration treatment is started are eluted into the second effluent solution.

In the third step of the process, a third salt solution is passed through the ion exchange column. This third salt solution is passed through the ion exchange column sequentially after the second salt solution. The third salt solution has a higher salt concentration than the second salt solution. Passing the third salt solution through an ion exchange column forms a third effluent solution. The third effluent solution comprises nitrate ions which have been removed from the ion exchange material.

Preferably, the third solution is chosen such that elution of an ion exchange material loaded with nitrate ions results in removal of at least some of the nitrate anions from the column into the third effluent solution. Preferably, the third effluent solution is enriched with nitrate anions compared with the third salt solution. Preferably at least 75% by weight of the total nitrate anions originally present in the ion exchange material before the regeneration treatment is started are eluted into the third effluent solution. More preferably, at least 90%, or at least 95% by weight of the total nitrate anions originally present in the ion exchange material before the regeneration treatment is started are eluted into the second effluent solution.

As used herein the term "before the regeneration treatment is started" refers to before any of the treatment steps (i) to (iii) have been carried out on the loaded column.

Preferably, the first effluent comprises at least 70%, at least 80%, at least 90%, at least 95% by weight of sulphate anions and/or bicarbonate anions based on the total weight of sulphate anions and/or bicarbonate anion present in the total of all the effluents eluted from the column.

Preferably, the second effluent comprises at least 70%, at least 80%, at least 90%, at least 95% by weight of chromate ions based on the total weight of chromate ion present in the total of all the effluents eluted from the column.

Preferably, the third effluent comprises at least 70%, at least 80%, at least 90%, at least 95% by weight of nitrate anions based on the total weight of nitrate anions present in the total of all the effluents eluted from the column.

The salt solutions used herein may be brine solutions. Preferably the salt solutions comprise sodium chloride and/or potassium chloride. Preferably the salt solution consists of a sodium chloride and/or potassium chloride solution. Preferably the second and/or third salt solution is a more concentrated solution of the same salt as the first solution.

Preferably the first salt solution comprises from 0.2 to 2.0% w/v of sodium chloride or potassium chloride, more preferably, it comprises from 0.75 to 1.0% w/v solution of sodium chloride or potassium chloride. Preferably, in order to remove sulphate anions and/or bicarbonate ions from the loaded material, but preferably not the nitrate anions and/or chromate ions, the concentration of chloride ions in the first salt solution is less than 4000, preferably less than 3000 ppm, more preferably less than 2000 ppm, or less than 1500 ppm.

Preferably, the second salt solution comprises from 0.3 to 8.0% w/v, preferably from 2.5 to 5.0 w/v, of sodium chloride or potassium chloride. Preferably, in order to remove chromate ions from the loaded material, the concentration of chloride ions in the second salt solution is from 3,000 ppm to 55,000 ppm. Preferably, the concentration of chloride ions in the second salt solution is from 10,000 ppm to 50,000 ppm. It is thought that above 6,000 ppm of chloride ions, the nitrate ions start to be removed from the column.

Preferably, the third salt solution comprises from 10 to 20% w/v of sodium chloride or potassium chloride. More preferably, it comprises from 12 to 15% w/v solution of sodium chloride or potassium chloride. Preferably, in order to remove nitrate ions from the loaded material, the concentration of chloride ions in the third salt solution is greater than 25,500 ppm, greater than 30,000 ppm, or greater than 60,000 ppm, and for example up to 75,000 ppm.

Preferably the salt concentration of the second salt solution passed through the ion exchange material is at least two times, at least five times, or at least ten times the salt concentration of the first salt solution passed through the ion exchange material.

Preferably the salt concentration of the third salt solution passed through the ion exchange material is at least two times, at least five times or at least ten times the salt concentration of the second salt solution passed through the ion exchange material.

Preferably, the first salt solution passed through the ion exchange material has a conductivity of from about 8 to about 20 mScm$^{-1}$ (milliSiemens cm$^{-1}$), more preferably it has a conductivity of from about 10 to about 15 mScm$^{-1}$, more preferably still about 12 mScm$^{-1}$.

Preferably, the second salt solution passed through the ion exchange material has a conductivity of from about 13 to about 150 mScm$^{-1}$, preferably from about 25 to about 60 mScm$^{-1}$, more preferably still about 30 mScm$^{-1}$.

Preferably, the third salt solution passed through the ion exchange material has a conductivity of greater than 160 mScm$^{-1}$, preferably from about 160 to about 220 mScm$^{-1}$, more preferably from about 180 to about 200 mScm$^{-1}$.

The conductivity of a solution may be measured using a standard conductivity probe with K factor of 10. Such a probe will typically measure conductivity from 1 mScm$^{-1}$ to about 230 mScm$^{-1}$. Preferably the measurements are taken at 25° C.

Preferably, the ratio of the volume of first salt solution introduced into the column to the volume of second salt solution introduced into the column is from 10:1 to from 5:1.

Preferably, the ratio of the volume of second salt solution introduced into the column to the volume of third salt solution introduced into the column is from 1:2 to from 1:10.

Preferably the method further comprises a step of passing water through the column forming an effluent wash water. More preferably the effluent wash water is recycled and reused in the regeneration method. The wash water is advantageously softened water. It may instead be raw water, for example, ground water, with or without further treatment, such as ground water that has been treated for removal of nitrate ions. A combination of softened water and raw water may be used, applied in a mixture or sequentially. The relative proportions of softened to raw water used can be varied to suit the incident levels of hardness cations and of other ions, for example, sulphate in the raw water. Advantageously, the wash water is recycled for use as the, or for the manufacture of the, first dilute solution. Advantageously, the water wash step is carried out in two phases, comprising a first phase in which a minor proportion of the wash water to be used is passed through the column and a second phase in which a major proportion of the wash water to be used is passed down the column. This enables a chloride ion spike conventionally observed when a freshly generated column is returned to service to be reduced or substantially eliminated.

Preferably the method further comprises collecting and/or further treating the first effluent, the second effluent and/or the third effluent.

Preferably the method further comprises recycling at least a portion of the first effluent solution through the ion exchange resin. This is advantageous as waste volume is reduced by recycling it.

Preferably the first effluent solution is collected and/or treated separately from the second effluent solution comprising chromate ions. Preferably, the second effluent solution comprising chromate ions is collected and/or treated separately from the third effluent solution comprising nitrate anions.

Preferably, the second effluent solution comprising chromate ions is subjected to an anion removal treatment to remove the chromate ions. Preferably, the third effluent solution containing nitrate anions is subjected to an anion removal treatment to remove the nitrate anions. Preferably, the anion removal treatment comprises an electrolytic treatment method.

Any suitable treatment method may be used for removal of nitrate ions from the effluent. Illustrative of suitable treatment methods are, for example, electrolytic treatment methods or microbiological treatment methods. Preferably, the effluent is treated to remove nitrate ions in an electrocatalytic method. It is preferred for the electrocatalytic treatment to be carried out in an electrocatalytic cell having a cathode surface that is coated with a layer of rhodium metal, which gives good electrical efficiency. One suitable form of electrocatalytic cell and its mode of operation is described in GB 2348209A. A further suitable method of operating such a cell is described in GB 2365023A.

Any suitable treatment method may be used for removal of chromate ions from the effluent. For example, methods based on reacting the chromate ions in the effluent with $Fe^{2+}$ ions such that the $Fe^{2+}$ ions are oxidised to $Fe^{3+}$ ions and the Cr(VI) ions are reduced to Cr(III) ions, which precipitate out of solution and can be removed as a slurry. Advantageously, using the method described herein, the volume of effluent which needs to be treated for chromate ion removal is low. This is advantageous in terms of cost savings, energy savings and/or man-power and equipment cost savings.

In a further aspect of the present invention there is provided the use of a salt solution to remove chromate ions from an ion exchange material loaded with chromate ions and nitrate anions; wherein the salt solution has concentration of chloride ions of from 3,000 ppm to 55,000 ppm.

It will be understood that some of the nitrate ions may be removed with the chromate ions. However, the present inventors have surprisingly found that by using a salt solution having a concentration of chloride ions of from 3,000 ppm to 55,000 ppm allows substantially all of the chromate ions to be removed from the column using only a low volume of solution. It also allows substantially all of the chromate ions to be removed (for example at least 90% by weight based on the total weight of chromate ions originally present on the column before treatment) separately and distinctly from the majority of the nitrate ions present on the column.

The method of the invention is in particular applicable to ion exchange material in a fixed bed, moving bed or fluidized bed, especially in a fixed bed.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The present invention will now be described further, by way of example only, with reference to the following figures, in which.

EXAMPLES

Example 1

A column containing nitrate-selective resin is loaded with water known to contain levels of nitrate exceeding the required standard and levels of chromium, to beyond its accepted service capacity for nitrate and exhibits continued removal of chromium.

Figure 1:
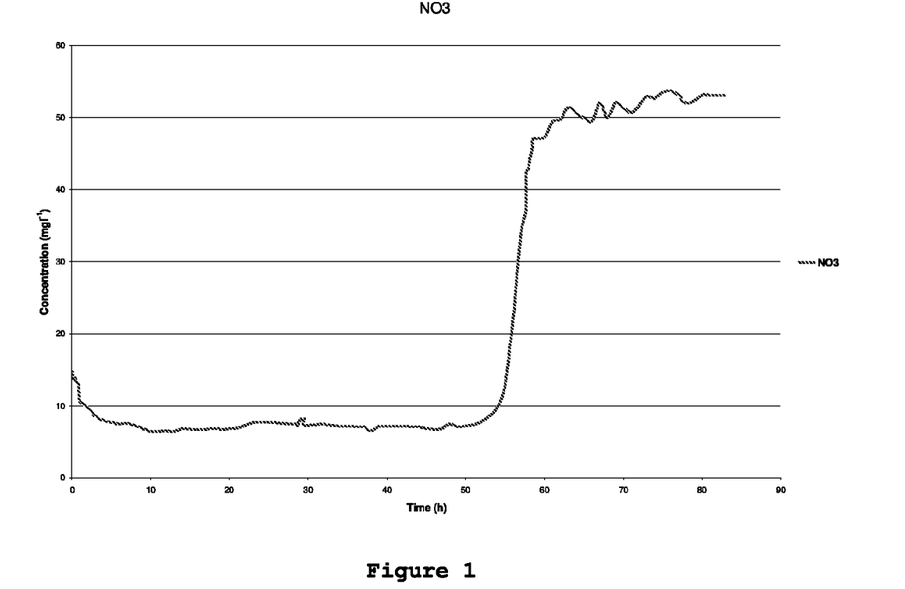
FIG. 1: is a graph showing the nitrate levels observed in the outlet from an ion exchange column containing nitrate-selective resin.

FIG. 1 shows the nitrate levels observed in the outlet from an ion exchange column containing nitrate-selective resin. This column would conventionally be taken out of service when nitrate levels in the output rise above a preset threshold, indicated by 'A' on the figure.

Figure 2:
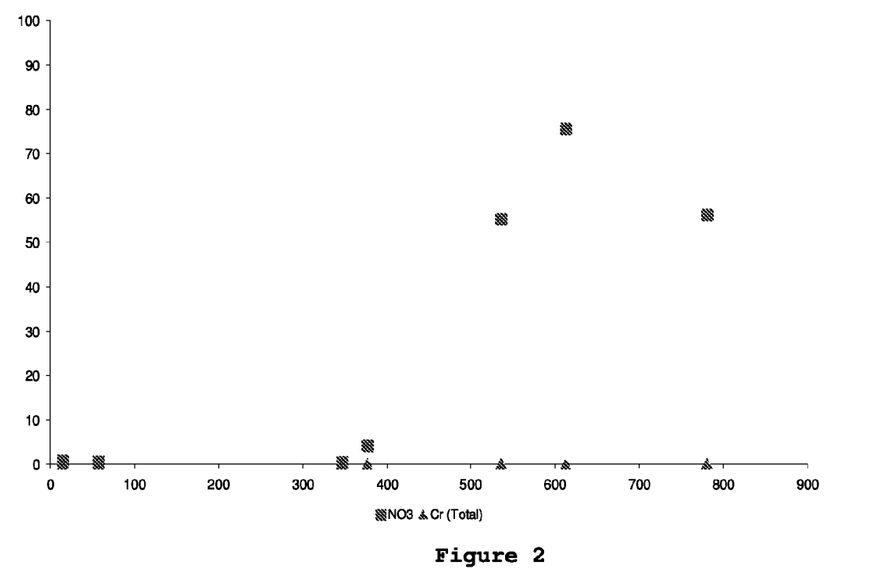
FIG. 2: is a graph showing the continued removal of chromium after the nitrate capacity of the same resin has been exceeded.

FIG. 2 shows the continued removal of chromium after the nitrate capacity of the same resin has been exceeded. It can be seen from FIG. 1 that the flow to two columns, one loaded to a point less than 'A' and one loaded to a point beyond 'A', can be adjusted to produce the desired output nitrate level.

Example 2

The Purolite A520E (a nitrate-selective ion resin) was loaded with nitrate ions and chromate ions. The following regeneration process in accordance with the invention was carried out.

A first KCl solution comprising 3000 ppm of chloride ions was prepared. 5 bed volumes of the first solution were passed through the column at flow rate of 5 bed volumes per hour to provide a first effluent comprising sulphate and bicarbonate anions.

A second KCl solution comprising 15000 ppm of chloride ions was then passed through the column. Half a bed volume of the second solution was passed through the column at a flow rate of 2 bed volume per hour to provide a second effluent comprising chromate ions.

A third KCl solution comprising 72000 ppm of chloride ions was then passed through the column. A total of 2.5 bed volume were passed through the column at a flow rate of 2 bed volumes per hour to provide a third effluent comprising nitrate anions.

Figure 3:
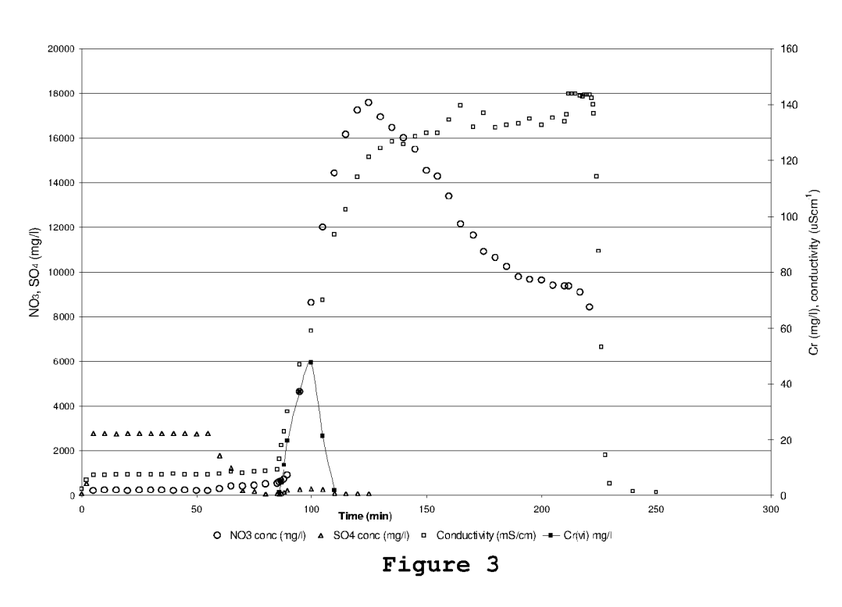
FIG. 3: is a graph showing the elution profile for an example of the present invention.

FIG. 3 shows that at time t is 0 to 85 minutes $HCO_3^-$ and $SO_4^{2-}$ are removed as a first dilute salt solution is passed through the column. From time t is 85 to 110 minutes, chromate ions (Cr (VI) ions) are removed as the concentration of chloride ions in the salt solution is increased as the second solution is passed through the column. From t is 110 to 220 minutes, nitrate ions $NO_3^-$ are removed as the concentration of chloride ions in the salt solution is increased as the third solution is passed through the column. From t 220 to the end shows the results as the column is washed.

This regeneration procedure clearly shows that the chromium can be removed in a small fraction of the waste volume, after the sulphate has been removed and co-incidentally at the beginning of the nitrate removal stage of the process (FIG. 3). In FIG. 3, Cr ($mgl^{-1}$) and $NO_3$, $SO_4$ (mg/l) are plotted on the secondary Y axis. It can clearly be seen that this offers the potential to separate the chromium into a fraction of the regenerant volume which could facilitate further volume reduction treatment.

Example 3

Figure 4:
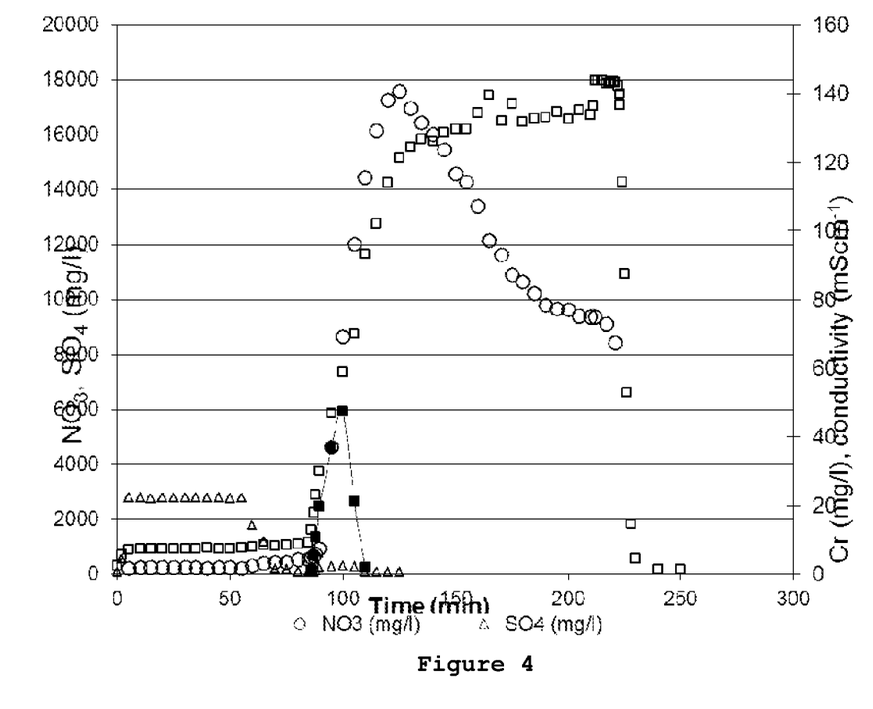
FIG. 4: is a graph showing the elution profile for Example 3 of the present invention.

Purolite A520e nitrate selective resin loaded to saturation then regenerated with 5 bed volumes of 0.3 to 0.8% potassium chloride solution, followed by 2.5 bed volumes of 14.9% potassium chloride solution [See FIG. 4].

In this example, the outlet of the separated sulphate can simply be slowly dosed back into the outlet water with negligible effect on the water composition. The chromium fraction can be separated from the bulk of the nitrate fraction and treated separately. The nitrate fraction can be treated in an electrochemical cell (see GB 2348209 A and GB 2365023 A). The rinse, at the end of the regeneration process, can be simply retained and re-used as the initial low concentration potassium chloride solution on the subsequent regeneration. The start of the rinse collection can be simply determined by monitoring the conductivity of the solution and setting the collection start point to achieve the desired final rinse concentration.

Example 4

Purolite A600/4149 SBA resin loaded to >20,000 bed volumes then regenerated with 11.7% sodium chloride solution, showing initial separation of the sulphate, then the chromium, as the chloride ion concentration increases.

Figure 5:
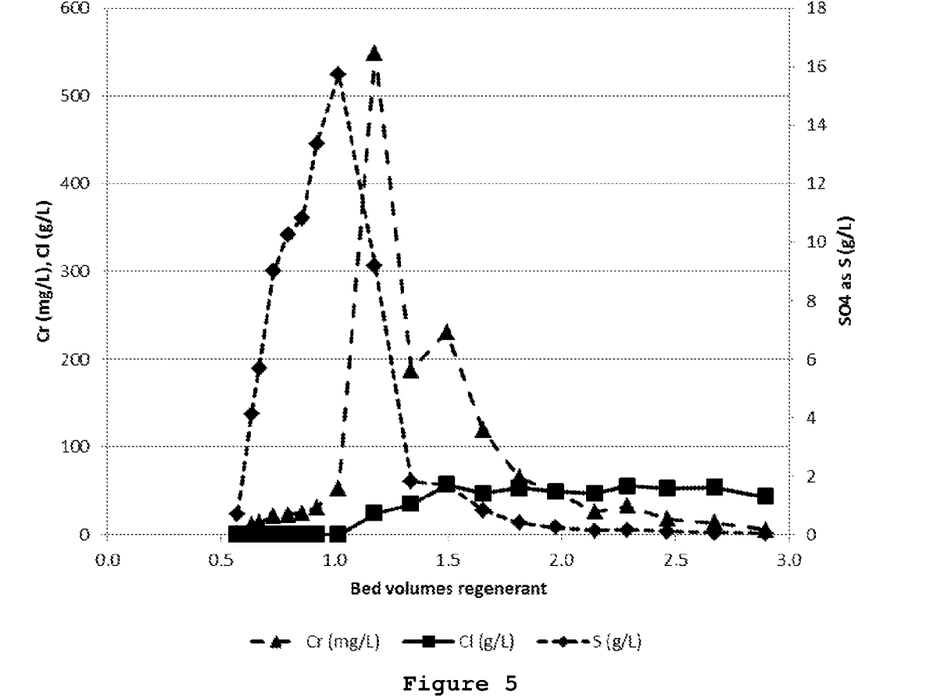
FIG. 5: is a graph showing the initial separation of the sulphate, then the chromium, as the chloride ion concentration increases, for Example 4 of the present invention.

In this example, the sulphate removed in the initial part of the regeneration, up to ~1 bed volume flow, contains very low levels of chloride and chromium and can be simply disposed to sewer, with the chromium fraction (from 1 to 2 bed volumes) separated for treatment into ~1 bed volume [See FIG. 5].

From examples 3 and 5, it can be expected that the initial use of a lower concentration of sodium chloride will further improve the separation of the sulphate from the chromium. As with example 3, the rinse can be retained and the concentration adjusted to allow its re-use on a subsequent regeneration. This achieves a considerable reduction in the total volume of regenerant requiring off-site treatment and disposal.

Example 5

Purolite A600/4149 SBA resin loaded to >20,000 bed volumes then regenerated with 5 bed volumes of 1.5% potassium chloride solution, followed by 1 bed volume of 14.9% potassium chloride solution.

Figure 6:
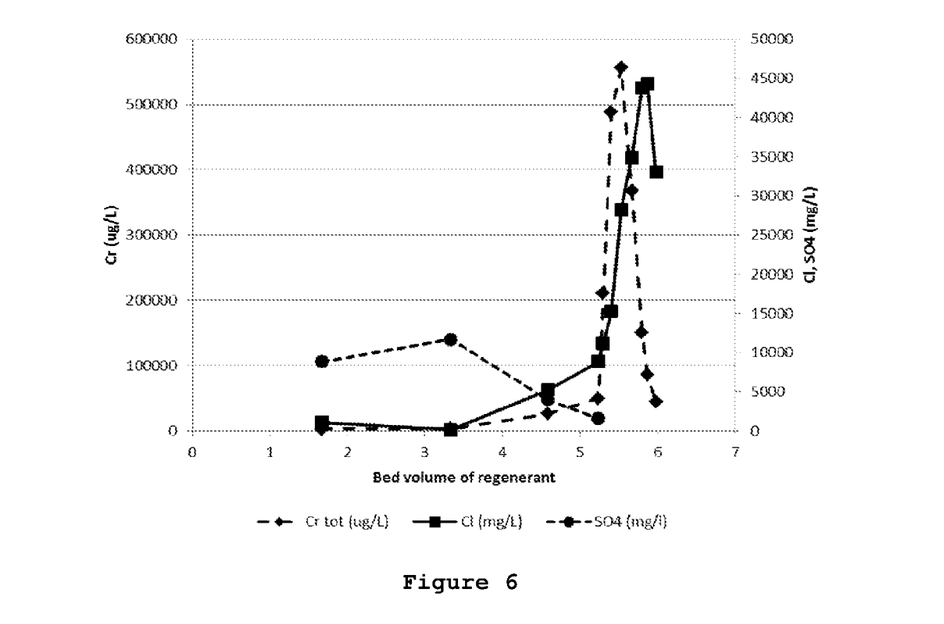
FIG. 6: is a graph showing the initial separation of the sulphate, then the chromium, as the chloride ion concentration increases for Example 5 of the present invention.

This example shows that an initial potassium chloride solution concentration of ~1.5% has successfully removed nearly all the sulphate within 5 bed volumes. Levels of chloride and chromium in this fraction are sufficiently low that there is potential to recycle this portion of the regenerant as potassium sulphate, which is a high value fertiliser. The chromium fraction can again be separated into under 1 bed volume for separate treatment and disposal [See FIG. 6].

The invention claimed is:
1. A method of regenerating an ion exchange material loaded with chromate ions and nitrate ions in an ion exchange column, the method comprising subjecting the loaded ion exchange column to a regeneration sequence comprising the following steps:
   (i) passing a first salt solution through the column forming a first effluent solution;
   (ii) passing a second salt solution through the column to at least partially remove the chromate ions from the column forming a second effluent solution, wherein the second salt solution has a higher salt concentration than the first salt solution;
   (iii) passing a third salt solution through the column to at least partially remove nitrate ions from the column forming a third effluent solution, wherein the third salt solution has a salt concentration higher than the second salt solution, wherein the first salt solution comprises from 0.2 to 2.0% w/v of sodium chloride or potassium chloride, wherein the second salt solution comprises from 0.3 to 5.0% w/v of sodium chloride or potassium chloride, and wherein the first salt solution comprises from 10 to 20% w/v of sodium chloride or potassium chloride.

2. The method according to claim 1 wherein the ion exchange material is a nitrate-selective anion exchange resin.

3. The method according to claim 1 wherein the first effluent solution comprises sulphate anions and/or bicarbonate anions which have been removed from the ion exchange material.

4. The method according to claim 1 wherein the salt concentration of the second salt solution passed through the ion exchange material is at least two times the salt concentration of the first salt solution passed through the ion exchange material.

5. The method according to claim 1 wherein the concentration of the third salt solution passed through the ion exchange material is at least two times the salt concentration of the second salt solution passed through the ion exchange material.

6. The method according to claim 1 wherein the first salt solution passed through the ion exchange material has a conductivity of from about 8 to about 20 $mScm^{-1}$.

7. The method according to claim 1 wherein the second salt solution passed through the ion exchange material has a conductivity of from about 13 to about 150 $mScm^{-1}$.

8. The method according to claim 1 wherein the third salt solution passed through the ion exchange material has a conductivity of greater than 160 $mScm^{-1}$.

9. The method according to claim 1 wherein the ratio of the volume of first salt solution introduced into the column to the volume of second salt solution introduced into the column is from 10:1 to 5:1.

10. The method according to claim 1 wherein the ratio of the volume of second salt solution introduced into the column to the volume of third salt solution introduced into the column is from 1:2 to 1:10.

11. The method according to claim 1 further comprising a step of passing water through the column forming an effluent wash water.

12. The method according to claim 11 wherein the effluent wash water is recycled and reused in the regeneration method.

13. The method according to claim 1 further comprising collecting and/or further treating the first effluent, the second effluent and/or the third effluent.

14. The method according to claim 1 wherein the first effluent solution is collected and/or treated separately from the second effluent solution comprising chromate ions.

15. The method according to claim 1 wherein the second effluent solution comprising chromate ions is collected and/or treated separately from the third effluent solution comprising nitrate anions.

16. The method according to claim 1 comprising recycling the first effluent through the ion exchange resin.

17. The method according to claim 1 wherein the second effluent solution comprising chromate ions is subjected to an anion removal treatment to remove the chromate ions.

18. The method according to claim 1 wherein the third effluent solution containing the nitrate anions is subjected to an anion removal treatment to remove the nitrate anions.

19. The method according to 1 wherein at least one of (a) the second effluent solution comprising chromate ions is subjected to an anion removal treatment to remove the chromate ions, or (b) the third effluent solution containing the nitrate anions is subjected to an anion removal treatment to remove the nitrate anions, and the anion removal treatment comprises an electrolytic treatment method.

* * * * *